United States Patent
Birkestrand et al.

(10) Patent No.: US 7,877,754 B2
(45) Date of Patent: Jan. 25, 2011

(54) METHODS, SYSTEMS, AND MEDIA TO EXPAND RESOURCES AVAILABLE TO A LOGICAL PARTITION

(75) Inventors: Daniel C. Birkestrand, Rochester, MN (US); Randall L. Grimm, Rochester, MN (US); Terry L. Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 10/645,125

(22) Filed: Aug. 21, 2003

(65) Prior Publication Data

US 2005/0044228 A1 Feb. 24, 2005

(51) Int. Cl.
*G06F 9/46* (2006.01)
(52) U.S. Cl. ..................................... 718/104
(58) Field of Classification Search ................ 709/226; 718/104
See application file for complete search history.

(56) References Cited

U.S. PATENT DOCUMENTS

| | | | |
|---|---|---|---|
| 5,579,222 A | 11/1996 | Bains et al. | |
| 5,717,604 A | 2/1998 | Wiggins | |
| 5,745,879 A | 4/1998 | Wyman | |
| 5,754,879 A | 5/1998 | Johnston | |
| 5,949,876 A | 9/1999 | Ginter et al. | |
| 5,951,633 A * | 9/1999 | Polcyn | 718/104 |
| 5,956,505 A | 9/1999 | Manduley | |
| 6,012,032 A | 1/2000 | Donovan et al. | |
| 6,058,423 A | 5/2000 | Factor | |
| 6,061,504 A | 5/2000 | Tzelnic et al. | |
| 6,061,732 A | 5/2000 | Korst et al. | |
| 6,230,200 B1 | 5/2001 | Forecast et al. | |
| 6,260,068 B1 * | 7/2001 | Zalewski et al. | 709/226 |
| 6,301,616 B1 | 10/2001 | Pal et al. | |

(Continued)

FOREIGN PATENT DOCUMENTS

JP 2002024192 A 1/1990

(Continued)

OTHER PUBLICATIONS

Dynamic Virtual Clusters in a Grid Site Manager Chase, J S Irwin, D.E. Grit, L.E. Moore, J.D. Sprenkle, S.E. Hight Performance Distributed Computing Jun. 22-24, 2003.*

(Continued)

*Primary Examiner*—Thomas Lee
*Assistant Examiner*—Mengyao Zhe
(74) *Attorney, Agent, or Firm*—Patterson & Sheridan, LLP

(57) ABSTRACT

Methods, systems, and media to expand resources available to logical partition associated with a client are contemplated. Embodiments may associate the logical partition with a grid that retains a list of resources, referred to as grid resources, available for allocation to logical partitions. The grid resources may include resources from, e.g., other logical partitions within the logically partitioned system, logical partitions from other logically partitioned systems, another type of system, a cluster, and the like. Further, one or more of the systems associated with the grid may include on-demand resources that are also available to supplement resources based upon the demands of the client. Embodiments may also monitor resource usage by the client and meter billable usage of the grid resources and/or on-demand resources based upon agreements between service providers and clients.

21 Claims, 5 Drawing Sheets

U.S. PATENT DOCUMENTS

| | | | |
|---|---|---|---|
| 6,460,082 B1 * | 10/2002 | Lumelsky et al. | ........... 709/226 |
| 6,584,489 B1 | 6/2003 | Jones et al. | |
| 6,625,750 B1 | 9/2003 | Duso et al. | |
| 6,931,640 B2 | 8/2005 | Asano et al. | |
| 7,013,296 B1 | 3/2006 | Yemini et al. | |
| 7,032,241 B1 | 4/2006 | Venkatachary et al. | |
| 7,039,784 B1 | 5/2006 | Chen et al. | |
| 7,124,098 B2 | 10/2006 | Hopson et al. | |
| 7,136,800 B1 | 11/2006 | Vega | |
| 7,146,496 B2 | 12/2006 | Circenis et al. | |
| 7,155,735 B1 | 12/2006 | Ngo et al. | |
| 7,322,034 B2 | 1/2008 | Crawford, Jr. et al. | |
| 2001/0025249 A1 | 9/2001 | Tokunaga | |
| 2002/0013802 A1 | 1/2002 | Mori et al. | |
| 2002/0016842 A1 | 2/2002 | Eki | |
| 2002/0124168 A1 | 9/2002 | Mccown et al. | |
| 2002/0156824 A1 | 10/2002 | Armstrong et al. | |
| 2002/0161891 A1 | 10/2002 | Higuchi et al. | |
| 2002/0166117 A1 | 11/2002 | Abrams et al. | |
| 2002/0169725 A1 | 11/2002 | Eng | |
| 2002/0178206 A1 | 11/2002 | Smith | |
| 2002/0178387 A1 | 11/2002 | Theron | |
| 2003/0018870 A1 | 1/2003 | Abboud et al. | |
| 2003/0028653 A1 | 2/2003 | New, Jr. et al. | |
| 2003/0036918 A1 | 2/2003 | Pintsov | |
| 2003/0093528 A1 | 5/2003 | Rolia | |
| 2003/0135580 A1 * | 7/2003 | Camble et al. | ............... 709/216 |
| 2004/0088412 A1 | 5/2004 | John et al. | |
| 2004/0103064 A1 | 5/2004 | Howard et al. | |
| 2004/0111308 A1 | 6/2004 | Yakov | |
| 2004/0148511 A1 | 7/2004 | Circenis et al. | |
| 2004/0194089 A1 | 9/2004 | McCarthy et al. | |
| 2004/0199473 A1 | 10/2004 | Birkestrand et al. | |
| 2004/0199632 A1 | 10/2004 | Romero et al. | |
| 2004/0215748 A1 | 10/2004 | Boonie et al. | |
| 2004/0255048 A1 | 12/2004 | Lev Ran et al. | |
| 2005/0015343 A1 | 1/2005 | Nagai et al. | |
| 2005/0049973 A1 | 3/2005 | Read et al. | |
| 2005/0246705 A1 | 11/2005 | Etelson et al. | |
| 2005/0268063 A1 | 12/2005 | Diao et al. | |
| 2006/0100962 A1 | 5/2006 | Wooldridge et al. | |
| 2006/0190615 A1 | 8/2006 | Panwar et al. | |
| 2006/0294238 A1 | 12/2006 | Naik et al. | |

FOREIGN PATENT DOCUMENTS

| | | |
|---|---|---|
| JP | 2001-331333 | 11/2001 |
| JP | 2002-024192 | 1/2002 |
| TW | 439031 A4 | 6/2001 |
| WO | 02086698 A1 | 10/2002 |

OTHER PUBLICATIONS

Virtualizing I/O Devices on VMware Workstation's Hosted Virtual Machine Monitor Proceedings of the 2001 USENIX Annual Technical Conference.*

A Case For Grid Computing On Virtual Machines Fortes et al May, 2003.*

U.S. Appl. No. 10/406,652, "Method to Provide On-Demand Resource Access", Daniel C. Birkestrand, et al., filed Apr. 3, 2003.

U.S. Appl. No. 10/616,676, "Apparatus and Method for Providing Metered Capacity of Computer Resources", Daniel C. Birkestrand, et al., filed Jul. 10, 2003.

iSeries Model 840 Manual, "V5R1 Planning Guide for Capacity Upgrade on Demand", Oct. 10, 2001, pp. 1-29.

iSeries Model 830 Manual, "V5R1 Planning Guide for Capacity Upgrade on Demand", Oct. 10, 2001, pp. 1-27.

IBM eServer iSeries 400 Presentation, "Capacity Upgrade on Demand", Oct. 3, 2000.

Katharina Friedmann, "Wie Gut Sind Capacity-on-Demand-Angebote?", pp. 1-5, Feb. 13, 2003, printed on Feb. 1, 2007, available at http://www.computerwoche.de/produkte_technik/weitere_beitraege/536343/index.html.

Sugerman, Jeremy et al., "Virtualizing I/O Devices on VMWare Workstation's Hosted Virtual Machine Monitor", Proceedings of the 2001 USENIX Annual Technical Conference.

Figueiredo, Renato J. et al, "A Case for Grid Computing on Virtual Machines", May 2003.

* cited by examiner

METHODS, SYSTEMS, AND MEDIA TO EXPAND RESOURCES AVAILABLE TO A LOGICAL PARTITION

BACKGROUND OF THE INVENTION

1. Field of the Invention

The present invention generally relates to the field of computers. More particularly, the present invention relates to methods, systems, and media for expanding resources available on computers.

2. Description of the Related Art

Parallel processing generally refers to performing multiple computing tasks in parallel. Traditionally, parallel processing required multiple computer systems with the resources of each computer system dedicated to a specific task or allocated to perform a portion of a common task. However, recent advances in computer hardware and software technologies have resulted in single computer systems capable of performing highly complex parallel processing by logically partitioning the system resources to different tasks. In a logically partitioned ("LPAR") computer system, available system resources are allocated among multiple sets of resources so that each set of resources can be operated independently of the other. The task of splitting these resources among logical partitions is typically accomplished via a layer of software components commonly referred to as a partition manager.

One objective of a partition manager is to allow each logical partition to run software, such as operating systems and operating system specific applications, that are typically developed to run on a dedicated computer system with little or no modification. For example, a system administrator may want one logical partition to run IBM's OS/400 operating system, a second logical partition to run IBM's AIX operating system, and a third logical partition to run the LINUX operating system. By providing the ability to run multiple operating systems on the same computer system, a logically partitioned computer system may provide a user with a great deal of freedom to choose the application software best suited to the users' need and with little or no regard to the operating system for which the application program was written.

One market for logically partitioned systems is a person or company, hereinafter referred to as a host service provider, that provides information technology ("IT") services to clients or customers, such as other individuals or groups within the same company or in other companies. The host service provider typically maintains the logically partitioned system and rents the logical partitions to the clients. The clients can then use one or more of the logical partitions as a network server, web server, and/or the like. The host service provider may also offer additional services, such as installing or de-installing software, updating software, adding or replacing hardware, data backup, and other IT services.

The host service provider typically charges the clients a negotiated fee for the equipment and services. When the clients are part of the same organization as the host service provider, the clients may have default agreements through rules set up by the organization and may be billed via charge accounts, or the like, that are associated with various groups within the organization. An accounting group for the organization may then handle the charges attributed to the charge accounts by adjusting budgets. In other situations, where the client is another company, the clients may execute contracts with the host service provider that outline rates for different services and get billed directly.

Clients associated with a host service provider can expand the resources available to their partition requesting additional services by re-negotiating the agreement with the host service provider, either directly with the host service provider or through other channels within an organization. For instance, as the client's business expands, the client may need more processing capacity, memory, hard drive space, etc., to keep up with the demands placed on the client's logical partition. The client may gauge the amount of resources to add based upon usage of current resources and decide that it is time to add the resource when the usage reaches a utilization threshold of the local partition's current resources.

One problem many clients experience is that conventional systems do not easily accommodate seasonal and/or periodic fluctuations in resource demands, or sharp increases in resource demands. For instance, clients that purchase or contract for resources to sufficient accommodate seasonal fluctuations find that these resources are significantly underutilized during the off-season. Similarly, clients that realize sharp increases in demand for resources are frequently compelled by potential losses of business and/or profits to expand quickly, and are thus placed in a disadvantageous position for purchasing or re-negotiating an agreement for resources.

The negative effect of fluctuating demand is not limited to the clients. The host service provider that provides the logical partitions maximizes profits (or maintains a budget) by trying to sell or lease the use of all the available resources in a logically partitioned system. Thus, the host service provider is unable to fully accommodate seasonal or emergency requests from its clients without maintaining its own spare capacity and/or adding new equipment on an emergency basis. These problems are compounded by the overhead associated with purchasing new equipment. For example, after purchasing a new logically partitioned system to accommodate the resource needs of a client, the host service provider will often need to configure the new resources, and then transfer software and data to the new system. This process can often require considerable time and expertise Therefore, there is a need for methods, systems, and media to provide more flexibility to host service providers and clients to expand resources available to a logical partition without incurring significantly increased initial costs.

SUMMARY OF THE INVENTION

Embodiments of the invention generally provide methods, systems, and media for expanding resources available to a logical partition. One embodiment provides a method for expanding resources available to a logical partition associated with a client. The method generally includes associating partition resources of the logical partition with a grid; providing grid resources from the grid to the logical partition based upon usage of the partition resources, wherein the grid resources are available to the logical partition; and providing on-demand resources to the logical partition based upon the usage of the partition resources and a usage of the grid resources when the grid resources are available to the logical partition.

Another embodiment provides a method for expanding resources available to a logical partition associated with a client. The method may include registering resources with a grid as grid resources; allocating grid resources to the logical partition after utilization of partition resources by the logical partition reaches a first utilization threshold; allocating on-demand resources to the logical partition after the logical partition reaches a second utilization threshold for the grid resources; and billing the client for usage of the on-demand resources.

Another embodiment provides an apparatus for expanding resources available to a logical partition associated with a client of a system having on-demand resources. The apparatus may include a grid associator to associate the logical partition with a grid; a resource monitor coupled with the grid associator to monitor usage of partition resources associated with the logical partition and usage of grid resources associated with the grid, and coupled with the on-demand resources to allocate the grid resources and the on-demand resources to the logical partition based upon utilization thresholds associated with the partition resources and the grid resources; and a resource meter coupled with the resource monitor to determine a first rate associated with an allocation of the on-demand resources to the logical partition for billing the client.

A further embodiment provides a computer readable medium containing a program which, when executed, performs an operation. The operation may include associating partition resources of a logical partition with a grid; providing grid resources from the grid to the logical partition based upon usage of the partition resources, wherein the grid resources are available to the logical partition; and providing on-demand resources to the logical partition based upon the usage of the partition resources and usage of the grid resources when the grid resources are available to the logical partition.

Other embodiments provide a method for managing and controlling allocation of resources of a logical partition, and a method for deploying a computer application on a host service provider system. One embodiment of a method for managing and controlling allocation of resources of a logical partition comprises providing grid resources to the logical partition based upon usage of the partition resources; and providing on-demand resources to the logical partition based upon a usage of the partition resources and a usage of the grid resources. The embodiment of a method for deploying a computer application on a host service provider system comprises installing an application on a logical partition of a computer system, the computer system having on-demand resources associated therewith; associating the logical partition with a grid, the grid having grid resources associated therewith; configuring the computer system to provide the grid resources to the logical partition based upon usage of the partition resources; and configuring the computer system to provide the on-demand resources to the logical partition based upon a usage of the partition resources and a usage of the grid resources.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
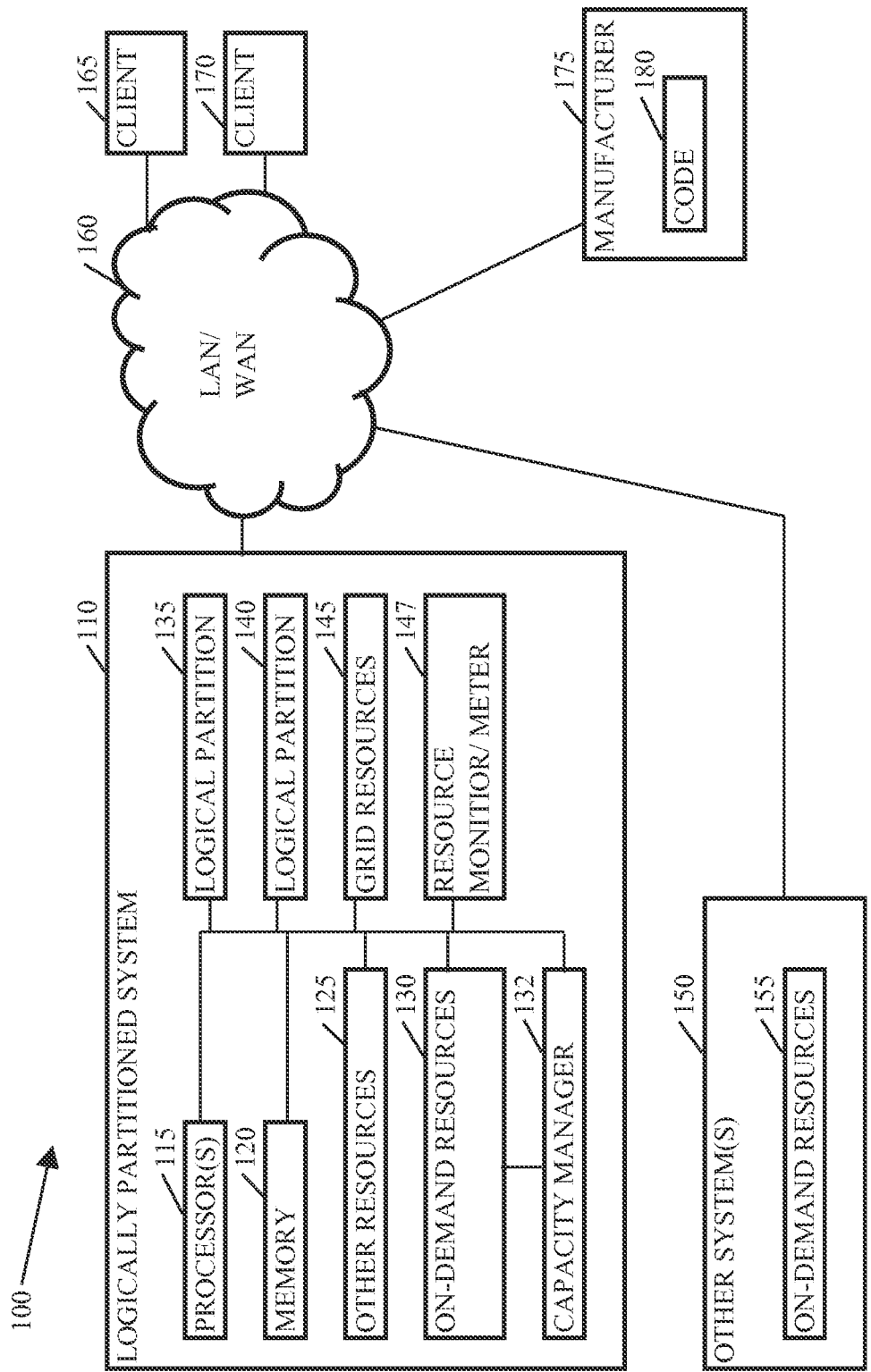
FIG. 1 is an embodiment of system including a logically partitioned system, other system(s), clients, and a manufacturer to expand the resources available to logical partitions.

The following is a detailed description of the embodiments of the invention depicted in the accompanying drawings. These embodiments are examples of how the invention may be implemented and are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the present invention contemplates methods, systems, and media to expand and allocate resources available to a client associated with a logical partition, as well as methods for metering and charging for these resources. Some embodiments of the present invention associate the logical partition with a grid that retains a list of resources available for use by the logical partition. A grid, in turn, generally refers to an association between computer systems, storage devices, logical partitions within the same logically partitioned system, logical partitions from another logically partitioned system, clusters of computer systems, I/O devices, and the like (referred to collectively as "grid resources") that are communicatively coupled together so that their capabilities can be shared/allocated among the participating systems. In this way, the clients associated with the participating partitions can enjoy the benefits of a very powerful system without incurring the conventional costs of such a system.

In some embodiments, the client systems in the grid may act as a donor of grid services at various times. As compensation, these donor systems may be eligible to receive the benefits of being a participating system and/or may receive contractual or monetary benefits, such as receiving a cash payment for the use of their resources or a discount off the cost for using the grid's resources. Depending upon the particular grid arrangement, the systems that donate resources to the grid may or may not retain control over how and when the resources are allocated. For example, a resource allocator for grid resources in some embodiments may have to request the use of grid resources from the donor system prior to allocating those resources. In other embodiments, the resource allocator can automatically assume full control of any resources donated by a donor system to the grid.

The grid resources may include part or all of the resources available to their respective physical systems. Thus, for example, a logical partition may request grid resources from a grid, which in turn are physically supplied to the grid by another logical partition on the same physical system. Further, one or more of the systems associated with the grid may have on-demand resources available to supplement the grid resources based upon the demands of the client. These on-demand resources generally refer to resources supplied with a system but that have not been enabled by the manufacturer of that system. The manufacturer can then charge the owner of the system, such as a host service provider, a separate fee to enable the on-demand resources either temporarily or permanently at some point after the system is purchased. Thus, for example, a system may include on-demand processors that can be enabled whenever the purchaser desires additional processing capacity by simply purchasing and entering an enablement code designed to enable the on-demand processors.

Because on-demand resources can be quickly and easily enabled at a later time, the purchaser of a computer system can advantageously purchase only those resources necessary to satisfy their immediate requirements, as opposed to having to purchase extra capacity to allow for demand fluctuations and growth. On-demand resources are also desirable for the manufacturer of the computer system because it will be in a strong position to sell that additional capacity when the purchaser needs to expand.

The combination of the grid resources and the on-demand resources used by some embodiments of the present invention is particularly desirable because it offers the host service provider with a highly flexible resource capacity, and the clients with the opportunity to contract for the resources to handle peak seasonal needs while contracting underutilized resources back to the host service provider during the off-season.

Embodiments of the present invention may monitor resource usage and meter billable usage of the grid resources and/or on-demand resources by the client. These embodiments frequently involve contractual agreements between service providers and clients regarding when grid and/or on-demand resources will be made available to the client, as well as the rates charged for each type of supplemental resource. These embodiments also frequently involve agreements between the host service provider and a manufacturer that sells computer systems with on-demand resources regarding the costs associated with enabling the on-demand resources.

One embodiment of the invention is implemented as a program product for use with a computer system such as, for example, the system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Turning now to the drawings, FIG. 1 depicts an embodiment of a system 100 for expanding resources available to a logical partition like logical partitions 135 and 140. System 100 comprises a logically partitioned system 110, other system(s) 150, a LAN/WAN 160, clients 165 and 170, and a system manufacturer 175. The logically partitioned system 110 in this embodiment is configured such that the available system resources, such as the processor(s) 115, a memory 120, and other resources 125, can be allocated among multiple, logical partitions, such as logical partitions 135 and 140. Each logical partition 135, 140 in this embodiment is designed and configured to appear to operate independently of the other. Thus, for example, one instance of the Advanced Interactive Executive (AIX) operating system may be executing within logical partition 135, and one instance of the OS/400 operating system may be operating within logical partition 140. The logically partitioned system 110 also includes on-demand resources 130, a capacity manager 132, grid resources and/or access to grid resources 145, and a resource monitor/meter 147 to manage common pools of resources available to supplement the resources of the logical partitions 135 and 140.

The processor(s) 115 in this embodiment include one or more system or host processors that provide the processing capacity for logically partitioned system 110. A system operator can divide the processors 115 into physical groups (e.g., processors 1-3 and 4-8) and assign them to the logical partitions 135, 140. A system operator can also divide the processor(s) 115 into logical processor units and then assign the fractions of each processor 115 to the logical partitions 135, 140 in any ratio. For example, the system operator may provide 25% of one processor to a logical partition 135 and 75% of the processor to logical partition 140. The system operator can also reserve processors and/or processor units for assignment to the logical partitions on demand.

The memory 120 may include one or more memory devices having blocks of memory associated with physical addresses, such as random access memory (RAM), read only memory (ROM), flash memory or other types of volatile and/or non-volatile memory. As with the processor(s) 115, the memory 120 can be divided into physical blocks and associated with the logical partitions 135, 140, and/or can be divided into logical partitions via logical blocks of addresses. The logical addresses can then be assigned to physical addresses as data is stored at the logical addresses.

The other resources 125 may include I/O controllers; I/O busses and I/O adapters, such as peripheral component interconnect (PCI) cards coupling logically partitioned system 110 with I/O equipment like tape drives; disk drives; hard drives; optical drives; network adapters; printers; scanners; etc. These other resources 125 may also be physically and/or logically associated with the logical partitions 135, 140, either on an exclusive or shared basis.

The on-demand resources 130 may include resources that can be enabled locally or remotely by the manufacturer 175, or by host service provider upon communication with the manufacturer 175, via the capacity manager 132. The enablement of these resources 130 is typically based upon an agreement between the manufacturer 175 and the host service provider that purchased or leased the logically partitioned system 110 from the manufacturer 175. These on-demand resources 130 may include additional processors, memory, hard drives, compact disk drives, tape drives, optical drives, and the like, that are present, but disabled, in the logically partitioned system 110 when purchased and that can be enabled upon payment of a predetermined fee.

The capacity manager 132 may provide metered capacity on demand to logically partitioned system 110 by enabling on-demand resources 130 with an enablement code and metering usage of on-demand resources 130 for the manufacturer 175. The resource monitor/meter 147 can then allocate and meter portions of on-demand resources 130 for logical partitions. In particular, capacity manager 132 in this embodiment includes an enablement code authenticator to verify that an enablement code is valid.

In some embodiments, the host service provider may contract for temporary availability of the on-demand resources 130 by requesting a temporary enablement code designed to expire in a number of, e.g., resource-hours. This on-demand resource may be assigned and used in a variety of ways. For example, one 24 processor-hour enablement code may be used to enable a single on-demand processor resource 130 for a 24 hour period, or may be used to enable six processors for four hours each. In several embodiments, the number or quantity of a resource can be fractional, such as using 50% of processing capacity of a single processor for 48 hours. In other embodiments, the agreement between the service provider and the manufacturer may provide for unlimited usage of all resources for a number of days at a single rate per day. The capacity manager 132 in these embodiments will recognize that the temporary enablement code is invalid after its first use.

In still other embodiments, the host service provider may agree to pay only for actual usage of the enabled resources, and the capacity manager 132 may monitor its actual usage. In these embodiments, the capacity manager 132 may facilitate billing the service provider per minute or per hour of actual usage in terms of resource quantity and time of on-demand resources 130. Periodically, or after the expiration of a time period/resource quantity associated with a temporary enablement code, the actual usage may be communicated to the manufacturer 175 to generate a bill for the host service provider. The service provider, in turn, will use this information to generate a bill for the client associated with the logical partition that used the resource.

In several embodiments, the manufacturer 175 may charge the service provider a single fee for an enablement code to permanently enable the on-demand resources 130, or a portion thereof, and the capacity manager 132 may verify the permanent enablement code and permanently enable corresponding on-demand resources 130. For example, a host service provider may purchase a computer with four enabled processors and four on-demand processors. The purchase agreement may provide the service provider with the option to purchase additional processors at a rate per physical processor or fractions of processing capacity. When the business of the service provider expands, the host service provider may purchase additional processing capacity available in on-demand resources 130 by contacting the manufacturer 175 via LAN/WAN 170 and requesting an enablement code to permanently enable a certain fraction of processing capacity. The manufacturer 175 in this example may then look up a code in the code 180 for host service provider's logical partitioned system based upon, for instance, the model number and serial number of logically partitioned system, or generate an enablement code based upon the model number, serial number, the date of the request and the quantity-time value of processing capacity requested, and transmit the enablement code to logically partitioned system 110. The capacity manager 132 in these embodiments will then interpret and authenticate the enablement code received from the manufacturer 175 and enable on-demand resources 130 to provide the quantity-time value of processing capacity purchased, an indication that the processing capacity is to be permanently enabled in this case, for use by logically partitioned system 110.

One suitable method for providing access to on demand resources is described in U.S. patent application Ser. No. 10/406,652, entitled "Method to Provide On-Demand Resource Access," which is herein incorporated by reference in its entirety. One suitable capacity manager 132 for providing metered capacity on demand is described in U.S. patent application Ser. No. 10/616,676, entitled "Apparatus and Method for Providing Metered Capacity of Computer Resources," which is also herein incorporated by reference in its entirety.

The logical partitions 135 and 140 in this embodiment represent physical and/or logical divisions of resources available from server 110 for clients 165 and 170. The division allows the logical partitions to operate as independent logical systems, each having processing capacity, memory, storage capacity, and I/O devices. For example, logical partitions 135 and 140 may each have access to, e.g., 50% of the processing capacity of processor(s) 115, the memory 120, and the data storage capacity of other resources 125. In this example, each logical partition 135, 140 is limited to using one half of the processing capacity of one or more of the physical processors; a range of logical memory addresses, dynamically assigned to physical memory address via a look-up table; and one half of the data storage capacity by physically dividing address ranges or providing a range of logical addresses. Some embodiments are capable of supporting 254 or more logical partitions.

Based upon agreements between the service provider associated with logically partitioned system 110 and its customers, the logical partitions 135 and 140 may be associated with the grid resources 145, the on-demand resources 130, the capacity manager 132, and the resource monitor/meter 147. More specifically, the agreements between the service provider and its customers may outline when and for what rate (or rates) the grid resources 145 and the on-demand resources 130 can be allocated to logical partitions 135 and 140. The resource monitor/meter 147 will then couple with the grid resources 145, the on-demand resources 130, and the capacity manager 132 to implement the agreement(s). For example, an agreement between the service provider and a customer associated with client 165 may provide for grid resources to be made available, to an extent that they are not fully utilized or are underutilized, to logical partition 135 when usage of the resources provided to logical partition 135 (referred to as partition resources) reaches or exceeds a partition utilization threshold. An illustrative partition threshold may be 80% of total resource capacity of the partition resources. Thus, the host service provider may configure the resource monitor/meter 147 to monitor the usage of partition resources by the logical partition 135 to determine when usage reaches 80% of the total resource capacity of the partition resources and, once the partition threshold is reached, to determine what grid resources 145 can be allocated to logical partition 135, if any, and then allocate those resources to the logical partition 135.

The host service provider may configure the resource monitor/meter 147 to retain a list of grid resources 145 from participating systems or partitions that are registered as grid resources. The grid resources 145 may couple with resource monitor/meter 147 to allocate and de-allocate grid resources 145 to and from logical partitions based upon usage of resources by the logical partitions and partition thresholds. The list of grid resources 145 may include, e.g., physical and/or logical descriptions of processor resources, memory resources, and other resources available for allocation as grid resources as well as priorities and utilization threshold(s) for grid resources associated with the participating logical partitions. In other embodiments, grid resources may be available to systems and/or partition whether or not they have registered resources with grid resources 145 for allocation as grid resources.

The host service provider may configure the resource monitor/meter 147 to monitor usage of partition resources, grid resources 145, and on-demand resources 130; to meter usages of resources having an associated usage fee; and to maintain a log of usages on a customer-by-customer basis for billing the corresponding customers. In some embodiments, the resource monitor/meter 147 periodically generates a bill for each client based upon the log and, in several of these embodiments, automatically transmits the bill to the corresponding customers.

The host service provider may configure the resource monitor/meter 147 to communicate with the logical partitions 135, 140 in order to monitor usage of partition resources and to allocate grid resources to a logical partition when the logical partition reaches or surpasses a threshold utilization of partition resources. To an extent that grid resources are insufficient to supplement resources available to a logical partition, the host service provider may configure the resource monitor/meter 147 to, when necessary, allocate on-demand resources 130 to the logical partition. For example, when the logical partition 135 reaches a partition threshold (e.g. logical partition uses 20% out of the 21% of processor clock cycles allocated to logical partition 135 from processor(s) 115), the resource monitor/meter 147 may check for and allocate available grid resources 145. Later, when the resource monitor/meter 147 determines that grid resources 145 have reached a utilization threshold for grid resources (e.g., 9% out of the 10% of processor cycles registered by logical partitions 135 and 140 and pooled via grid resources 145), the host service provider may configure the resource monitor/meter 147 to request that the capacity manager 132 enable some on-demand resources 130. In response, the capacity manager 132 requests and verifies an enablement code from the manufacturer 175, and then enables on-demand resources 130 to logically partitioned system 110. The resource monitor/meter 147 can then allocate the on-demand resources 130 to logical partition 135, supplementing an allocation of grid resources based upon usage of resources by logical partition 135.

When allocating resources from on-demand resources 130 to logical partition 135, the customer associated with logical partition 135 may be charged a rate for usage based upon the agreement between the service provider and the customer. For instance, the customer may be charged for one day of usage of on-demand resources for each day within which logical partition is allocated on-demand resources 130. In particular, logical partition 135 may be allocated on-demand resources for one hour of a first day; however, resource monitor/meter 147 may log a charge of one day of usage to at least cover the costs of enabling on-demand resources for the customer. In some embodiments, the rate charged to the customer may depend upon the capacity of on-demand resources 130 actually used by logical partition 135.

In further embodiments, the host service provider may configure the resource monitor/meter 147 to determine the rate based upon the portion of on-demand resources 130 enabled to accommodate an allocation of on-demand resources 130 to logical partition 135. For example, an agreement between the service provider and the manufacturer 175 may stipulate units of on-demand resources 130 that must be enabled as a whole, such as one processor unit per hour. Thus, even though logical partition 135 may be allocated a half of a processor unit for an hour, resource monitor/meter 147 may meter the allocation to logical partition 135 as one processor unit for an hour, or in some cases, for a day.

In still other embodiments, the host service provider may configure the resource monitor/meter 147 to determine a rate charged to the customer associated with logical partition 135 for allocation of on-demand resources 130 based upon the number and/or capacities of allocations to other logical partitions or other systems 150. For example, when both logical partition 135 and 140 are allocated on-demand resources 130 during the same day, resource monitor/meter 147 may charge logical partitions 135 and 140 reduced rates. The actual rates charged to the customers of logical partition 135 and 140, respectively, however, may depend upon the agreements between the respective customers and the service provider by, for instance, maintaining a representation of the rates in memory or other data storage that is accessible by resource monitor/meter 147. In one embodiment, resource monitor/meter 147 may determine the rates charged to logical partitions 135 and 140 when they share the same portion of on-demand resources 130 at different times during the same day, divide the rates for the on-demand resources 130 during that day, in half.

The host service provider may also configure the resource monitor/meter 147 to log the allocations and/or usages of on-demand resources 130 and the rates charged to customers for those allocations and/or usages. In some embodiments, resource monitor/meter 147 may determine and log the rates at the end of the day, periodically, or in response to a billing request by a client or the service provider, particularly when rates depend upon the number and capacities of allocations of on-demand resources 130.

In further embodiments, the host service provider may configure the resource monitor/meter 147 to allocate and de-allocate grid resources 145 and/or on-demand resources 130 based upon requests from logical partitions like logical partitions 135 and 140. For example, when logical partition 135 reaches a utilization threshold for, e.g., processing capacity, logical partition 135 may request that additional processing capacity be allocated to logical partition 135 and, depending upon the availability of grid resources, grid resources and/or on-demand resources 130 may be allocated in response to the request. In some of these embodiments, a higher utilization threshold may be set for requesting on-demand resources 130 than grid resources 145. For example, logical partition 135 may request an allocation of grid resources when the utilization threshold of partition resources for logical partition 135 has reached or exceeded 80% of partition resources. On the other hand, the logical partition 135 may not request allocations of on-demand resources 130 until the utilization threshold of partition resources has reached 100% and grid resources are unavailable.

In many embodiments, allocations of grid resources 145 may also be associated with a rate. In such embodiments, the host service provider may configure the resource monitor/meter 147 to meter and log usage and/or allocations of grid resources 145 to a logical partition. For example, one processor unit of processing capacity from logical partition 135 may be registered with grid resources 145. Based upon an agreement between the customer associated with logical partition 135 and the service provider, the logical partition 135 may be eligible to receive allocations of up to 200% of registered resources, or two processor units of processing capacity, from grid resources, if available, at no additional cost. Thus, the resource monitor/meter 147 may meter allocations or actual usage of grid resources by logical partition 135 to the extent that the allocations or actual usage exceed two processor units of processing capacity.

In some embodiments, agreements with customers may stipulate that the rate charged for resources will vary depending on factors such as time of day, time of year, and the like. For example, some host service providers may configure the resource monitor/meter 147 to charge the clients more for capacity between 8:00 am and 6:00 pm, than between 11:00 pm and 6:00 am, to reflect the higher demand for resources during the work day. Similarly, extra capacity during traditionally busy periods, like December, may cost more than capacity in traditionally less busy periods, like June and July. In several embodiments, the resource monitor/meter 147 may monitor, meter, and log usages of individual resources, such as processing capacity, memory capacity, hard drive capacity, and/or other capacities separately, and calculate fees depending on the relative cost of each type of resource.

In another embodiment, agreements with customers may stipulate, and accordingly, the host service provider may configure the resource monitor/meter 147 to allocate resources registered with grid resources 145 on a first come, first serve basis. More specifically, when logical partition 135 registers a processor unit of processing capacity with grid resources 145, that processing capacity may be allocated to logical partition 140 and remain unavailable to logical partition 135 until the processing capacity or a portion thereof is de-allocated from logical partition 140. In other embodiments, logical partitions may be assigned a priority for receiving grid resources (or resources at grid resource rates) based upon, e.g., the quantity and time of partitions resources registered with grid resources 145 or the amount charged for the use of the grid resources.

Agreements between the service provider and customers may also provide for allocation of on-demand resources 130. In these embodiments, the host service provider may configure the resource monitor/meter 147 to automatically enable and allocate on-demand 130 resources once a utilization of grid resources reaches a grid utilization threshold. The grid utilization threshold, or grid threshold, may represent the utilization level associated with grid resources as a whole, i.e., all resources registered with grid resources 145. For example, grid resources may include two processing units of processing capacity. When 100% of the grid resources have been allocated, resource monitor/meter 147 may request that on-demand resources 130 are enabled via capacity manager 132 so that subsequent allocations of processing capacity are made from on-demand resources 130. The manufacturer 175 receives the request and, if the request is authenticated, generates an enablement code and returns the code to logically partitioned system 110. The capacity manger 132 receives the enablement code and verifies that the code is valid. If the enablement code is valid, the capacity manager 132 enables and meters on-demand resources 130 for the logically partitioned system 110. Then, the resource monitor/meter 147 may allocate and meter the newly enabled on-demand resources to logical partitions 135 and 140.

In another embodiment, based upon an agreement between the service provider and the customer associated with logical partition 135, the host service provider may configure the resource monitor/meter 147 to determine that the grid utilization threshold for logical partition 135 has been reached when, for example, 80% of the total grid resources are being utilized by logical partition 135. Thus, when 80% of the total grid resources are being utilized by logical partition 135, the resource monitor/meter 147 may enable the on-demand resources 130 and allocate on-demand resources after grid resources are 100% allocated.

In still other embodiments, the host service provider may configure the resource monitor/meter 147 to enable on-demand resources based on an amount of usage of the grid resources over time. That is, if a particular logical partition frequently requires grid resources 145, the host service provider may configure the resource monitor/meter 147 to automatically enable additional on-demand resources 130 for that client. These embodiments may be particularly desirable for use in environments where the grid resources 145 are comparatively more expensive, but easier to allocate for short periods, than the on-demand resources 130. In addition, the host service provider may configure some resource monitor/meter 147 embodiments to selectively enable on-demand resources 130 or grid resources 145 based on which is better suited for a particular system load. Thus, for example, if the resource monitor/meter 147 in these embodiments determines that a particular job consists of a large number of interdependent calculations, it will enable and selectively route the job to the on demand resources 130.

The other system(s) 150 may communicate and couple with the logically partitioned system 110. The other system(s) 150 may include systems like computers or logically partitioned systems that may participate or register resources with grid resources 145. One or more of the other system(s) 150 may also include additional on-demand resources 155 that can be allocated to logical partitions 135 and 140. In some embodiments, for instance, the other system(s) 150 may include other computers or servers in the same cluster as logically partitioned system 110 such that resources of the other system(s) 150 can be shared via high speed loops (HSLs) like Opticonnect, LAN, and asynchronous transfer mode (ATM). Usage and/or allocations of on-demand resources 155 by logical partitions 135 and 140 may be metered and logged by resource monitor/meter 147.

The WAN/LAN 160 is a network connection to communicatively couple the logically partitioned system 110 with client computers, such as clients 165 and 170. In some embodiments, the WAN/LAN 160 may include a network in an office coupled via Ethernet, ATM, OptiConnect, and the like. In some embodiments, the WAN/LAN 160 also couples with the Internet via a cable modem, a direct subscriber line (DSL), a T1 line, a T3 line, fiber optic line, or the like. In further embodiments, the WAN/LAN 160 may include a network of temporary connections such as connections via a telephone system. For example, logical partition 135 operates as a web server allowing multiple customers to connect to a web site independently for facilitating business-to-customer (B2C) transactions. When a client business, like client 165 experiences a large number of transactions concentrated in a short period of time, such as increased seasonal sales during popular holidays, the processing requirements for processing business transactions with customers simultaneously or substantially simultaneously may be greater than the processing capacity available to logical partition 135. Thus, processing capacity available via grid resources 145 and/or on-demand resources 130 may be allocated to logical partition 135 to handle the high seasonal processing demands of logical partition 135.

Clients 165 and 170 may include one or more computer systems like notebooks or desktop computers. Clients 165 and 170 may couple with logically partitioned system 110 via a LAN or WAN like LAN/WAN 160. In some embodiments, clients 165 and 170 couple with a relay device such as a hub or switch that connects to logical partitions 135 and 140 of logically partitioned system 110.

The manufacturer 175 may be the manufacturer of logically partitioned system 110, or a representative thereof, that is accessible via the LAN/WAN 160 to obtain one or more temporary or permanent enablement codes for on-demand resources 130. When the manufacturers are the same, the manufacturer 175 may also provide one or more temporary or permanent enablement codes for on-demand resources 155. In other embodiments, the manufacturer 175 is accessible by other means such as paper mail, courier, telephone, or facsimile.

In one embodiment, the manufacturer 175 is configured with an enablement code generator, referred to herein as code 180. The code 180 in this embodiment is an algorithm capable of generating an enablement code. The code 180 may be invoked by a request received from logically partitioned system 110 via LAN/WAN 160. In response to a request, the code 180 generates the enablement code, which may be returned to the logically partitioned system 110 via the same network connection. Alternatively, the enablement code may be returned via a different network connection, e.g., a subsequent network connection or an altogether different network. In a particular embodiment, the enablement code is transmitted electronically to an electronic mail application (e.g., Lotus Notes® or Microsoft Outlook®; not shown) residing on the logically partitioned system 110. Lotus Notes is a registered trademark of International Business Machines, Inc., and Microsoft Outlook is a registered trademark of Microsoft, Inc. In yet another alternative, the enablement code is provided to a representative of the host service provider (e.g., an administrator) of logically partitioned system 110 via paper mail (i.e., the postal service) or facsimile, for example.

Figure 2:
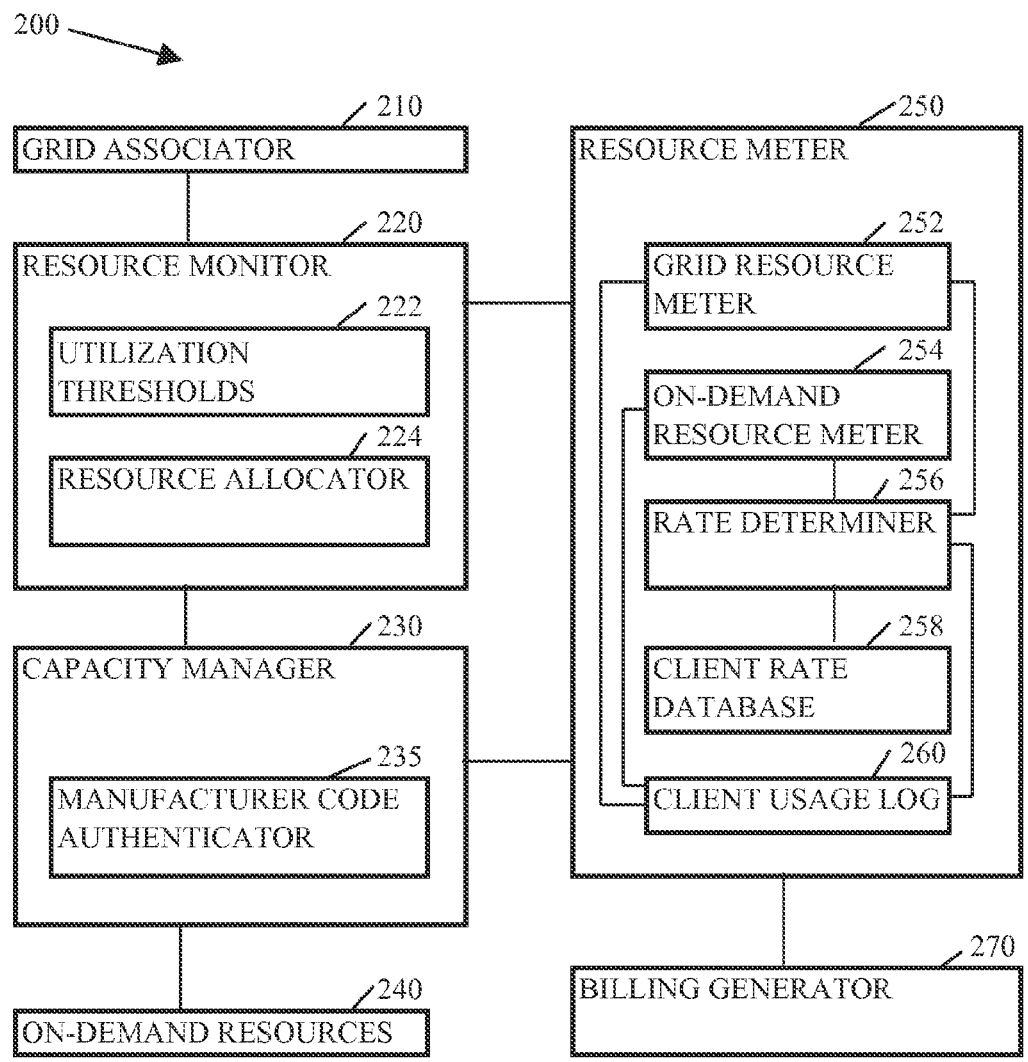
FIG. 2 is an embodiment of a logically partitioned system having one or more logical partitions, hardware resources, and on-demand resources to expand the resources available to the one or more logical partitions.

Referring now to FIG. 2, there is shown an embodiment of an apparatus 200 to expand resources for a logical partition. Apparatus 200 may be part of or separate from but coupled with a logically partitioned system and may include a specific purpose system like a state machine or specific purpose processors, a general purpose machine configured by software to execute aspects of the invention, combinations of the two, or the like. In particular, apparatus 200 may track usage of partition resources by logical partitions, allocate grid resources and on-demand resources to the logical partitions in response to usage and meter usage of grid and/or on-demand resources that are associated with a rate based upon agreements between the service provider associated with the logically partitioned system and the clients. More specifically, apparatus 200 includes a grid associator 210, a resource monitor 220, on-demand resources 240, a resource meter 250, a capacity manager 230, and a billing generator 270.

Grid associator 210 may associate one or more logical partitions with a grid. The grid represent a list of resources pooled as grid resources for allocation to logical partitions when the logical partitions reach utilization thresholds of their respective partition resources. For example, a logical partition of a first client may allocate partition resources to the grid to negotiate a reduced rate for the partition resources. In some embodiments, the client's use of partition resources may increase during spring and summer so the client may negotiate for partition resources sufficient or substantially sufficient for expected demands during the spring and summer and negotiate a reduced overall cost with the service provider by offering to register an anticipated capacity of underutilized partition resources to the grid during the fall and winter. At the same time, the service provider can encourage the client to register the partition resources to the grid, since the client can obtain allocations of grid resources and/or on-demand resources, if necessary, to supplement partition resources for unanticipated business during the off-season.

Resource monitor 220 monitors contemporaneous usage of partition resources and grid resources to determine when to allocate and de-allocate grid and on-demand resources for a logical partition. In other words, resource monitor 220 references with grid associator 210 to monitor usage of partition resources associated with the logical partition and overall usage of grid resources, to allocate the grid resources and on-demand resources to the logical partition based upon utilization thresholds associated with the partition resources and the grid resources. For example, the logical partition may reach a utilization threshold, agreed upon by the service provider and the client, which enables an allocation of additional resources such as grid resources or on-demand resources. Resource monitor 220 recognizes that the utilization threshold of partition resources has been reached or surpassed and determines whether sufficient resources are available from grid resources to allocate resources to the logical partition. When the unallocated grid resources are insufficient to handle an allocation or a utilization threshold for grid resources is reached, on-demand resources 240 are enabled.

Utilization thresholds 222 may maintain utilization thresholds for each logical partition and for the grid resources. For example, a utilization threshold may be set to 80% capacity of total grid resources. When allocations of resources reach 80% of the total grid resources, resource monitor 220 may communicate with capacity manager 230 to request an enablement code for on-demand resources 240 such as a permanent or temporary enablement code.

Similarly, a utilization threshold may be set for all logical partitions or registered logical partitions such as 90% of partition resources or each client may set individual utilization thresholds for grid and/or on-demand resources. For example, a utilization threshold for partition resources may be set as 90% for enabling grid resources and 98% for enabling on-demand resources 240. Utilization thresholds may also be time-dependent. Thus, to continue the previous example, a system may also enable on-demand resources if a logical partition required grid resources for more than 15 hours during the previous 5 days.

In some embodiments, utilization thresholds 222 may also maintain different utilization thresholds for different types of resources. For instance, the utilization thresholds for a logical partition may include one or more utilization thresholds for processor allocations, one or more utilization thresholds for memory allocations, and one or more utilization thresholds for other types of resources. Further, when local and remote on-demand resources are available, different utilization thresholds may be associated with the local and remote on-demand resources.

Resource allocator 224 may reference utilization thresholds 222 to allocate an underutilized portion of grid resources to a logical partition when the logical partition utilizes at least a utilization threshold of the partition resources. Further, resource allocator 224 may allocate a portion of the on-demand resources 240 when the logical partition utilizes at least a threshold utilization of the partition resources (such as 95%) and the grid resources that are available are insufficient to supplement the partition resources of the logical partition based upon resource usage by the logical partition. In particular, resource allocator 224 may request an enablement code for on-demand resources 240, capacity manager 230 may enable on-demand resources upon receipt and verification of the enablement code, and resource allocator 224 may allocate on-demand resources amongst logical partitions based upon usage and/or requests by the logical partitions.

Capacity manager 230 may enable the on-demand resources upon receipt of a valid enablement code. The enablement code may be received from a manufacturer, or an agent thereof, of a logically partitioned system and, in this embodiment, is unique and configured for use only on a particular machine (e.g., the specific logically partitioned system for which the enablement code was requested).

Capacity manager 230 may include a manufacturer code authenticator 235. Manufacturer code authenticator 235 may be invoked to verify an enablement code. As noted above, the enablement code is preferably specific to a particular machine. Accordingly, manufacturer code authenticator 235 determines whether the enablement code is configured for the particular system. If the enablement code is verified, the selected, on-demand resources 240 are enabled, e.g., hardware selected based upon a resource-time value, wherein a value associated with capacity utilized is multiplied by a value representing the amount of time the capacity is utilized, to determine the life of the enablement code.

In one embodiment, "enabling" or "unlocking" resources operates to place the resources into service (i.e., to perform their designated functions such as processing or storing, depending upon the resource). In particular, these resources may be placed into service for a period of time. In another embodiment, enabling the resources does not place the resources into service, but merely makes the resources available for resource allocator 224. That is, enabling the resources unlocks the resources so that resource allocator 224 can allocate units of the resources to a logical partition, for instance, but does not automatically give control of the resources to the operating system(s) on the logically partitioned system. It should be clear that regardless of the manner in which resources are placed into service, the duration for which the resources are in use (or at least available to be used if needed during continued operation of the system) may be predefined. Once the specified time limit expires, the enabled resources are disabled from further use.

Similar to grid resources, on-demand resources 240 may be any variety of resources in a computerized apparatus. For instance on-demand resources 240 may include software applications, firmware applications, and various types of hardware. In one embodiment, grid resources pool a number of connections allowed to connect with a logical partition and on-demand resources 240 includes additional allowances that can be purchased on a quantity per time basis.

Resource meter 250 communicates with the resource monitor 220 to monitor and log usage by logical partitions over time and associates the usage with rates for billing the corresponding clients. Resource meter 250 may include a grid resource meter 252, an on-demand resource meter 254, a rate determiner 256, a client rate database 258, and a client usage log 260.

Grid resource meter 252 may track usage of grid resources to determine a rate to charge corresponding clients for allocations of grid resources to logical partitions. Grid resource meter 252 may also couple with rate determiner 256 to associate a rate with the usage of grid resources. For example, grid resources may be associated with a rate for usage to advantageously offset costs associated with allocations of on-demand resources 240. In particular, a client may agree with the service provider to pay a rate for usage of grid resources to receive an agreement from the service provider to reduce rates billed to the client for allocations of on-demand resources 240.

On-demand resource meter 254 may track usage of on-demand resources 240 to determine a rate to charge corresponding clients for allocations of on-demand resources 240 to logical partitions. On-demand resource meter 254 may also couple with rate determiner 256 to associate a rate with the usage of on-demand resource meter 254. For example, the service provider may purchase a temporary enablement code having a resource-time value. On-demand resource meter 254 tracks the actual usage of on-demand resources by the client(s) so the service provider can recoup the costs involved with purchasing the enablement code by charging a rate to client(s) for actual usage, or allocations based upon actual usage, of on-demand resources 240.

Rate determiner 256 may determine rates to charge clients for usage of grid resources and/or on-demand resources 240. More specifically, rate determiner 256 may determine a rate based upon usage of the grid resources by the client to offset costs associated with enabling on-demand resources 240, a rate based upon usage of on-demand resources 240 by the client to at least recoup costs associated with enabling on-demand resources 240, and/or a rate to charge the client based upon an agreement for allocations of the grid resources and the on-demand resources 240 to the logical partition associated with the client. For example, an enablement code to enable on-demand resources 240 may be offered at a lower rate when the enablement code is associated with a time limit within which the resources may be utilized. The service provider may purchase the enablement code and rate determiner 256 may split the costs between one or more clients based upon their actual usage or allocations based upon their actual usage of on-demand resources 240.

As another example, the enablement code may enable on-demand resources 240 for, e.g., two months like November and December for the holidays, and the cost of the enablement code may be based upon the actual usage of on-demand resources 240 during the two months. As a result, to recoup the cost of the enablement code, rate determiner 256 may split costs between clients associated with logical partitions that received allocations from the on-demand resources 240 during those two months. In such embodiments, rate determiner 256 may determine rates periodically to facilitate billing clients, or at the end of the two month period.

Rate determiner 256 may couple with grid resource meter 252 and on-demand resource meter 254 to associate the rates with usages by clients or with clients and may store the rates in client usage log 260. For example, when different rates may apply to usage of on-demand resources 240 depending upon usage by other clients or the agreement between a client and the service provider, the rates determined by rate determiner 256 may be associated with specific usages of the grid resources and/or on-demand resources 240. On the other hand, when a single rate is charged for usage of grid resources and/or on-demand resources 240, the rate(s) may be associated with the client in the client usage log 260 rather than with specific entries of usages for the corresponding clients.

Client rate database 258 may include rates or formulas to determine rates based upon agreements between the service provider and clients. In some embodiments, client rate database 258 may include individual rates for each client, rates for groups of clients, and/or default rates selected by the service provider. For example, a group of clients, e.g., clients that executed a first standard contract with the service provider, may be charged the same rate for usage of grid resources and/or on-demand resources 240. The group rates may be stored in client usage log 260 and the clients in the group may be associated with those group rates.

Client usage log 260 may track allocations of resources to the logical partition to supplement the partition resources and one or more rates associated with usages like actual usages or allocations based upon actual usages.

Billing generator 270 may be configured to generate billing information for clients including, e.g., usages of grid resources and on-demand resources 240, rates associated with the usages and totals due for the usages. In general, the billing information may be generated periodically according to a predefined schedule, or on demand. In any case, generation of billing information may be facilitated by client usage log 260. For example, the resource meter 250 may write information into client usage log 260 including which resources are enabled and the corresponding time value for the enabled resources. In some embodiments, resource meter 250 may also record resource usage information such as requested time expired for a resource, requested time remaining for a resource, total runtime hours for a each enabled resource, the identity of the process or administrator that requested the On/Off capacity, and various enabled resource-specific metrics such as CPU cycles used, bytes of memory used, event timestamps, etc.

Information contained in client usage log 260 is retrieved by a billing generator 270 to generate bills or invoices for clients and transmit the bills to the clients or present the bill on a display upon request by a client. Billing generator 270 may also retrieve or receive information from other sources. For example, the billing generator 270 may retrieve a current timestamp and date stamp. In one embodiment, the billing generator 270 invokes an algorithm (embodied in hardware, software or combination thereof capable of producing an encrypted signature. Particular examples of encryption technology that may be used include checksums, Digital Signature Standard (Federal Information Processing Standard 186-2), Elliptic Curve Crypto systems (ECC) and Data Encryption Standard-Method Authentication Code (DES-MAC) and any other technology, known or unknown. In a particular embodiment, the encrypted signature uses as input a variety of billing information provided by the billing generator 270 such as the contents of the log 132, for example to verify the authenticity of selected essential items of the billing information. One suitable method for authenticating billing information is described in U.S. patent application Ser. No. 10/406,164, which is herein incorporated by reference in its entirety.

Generally, billing generator 270 may be accessed locally (e.g., by an administrator representing the service provider) or remotely (e.g., by a client) for requesting, viewing, or printing a bill or a detailed list of usages by one or more clients along with the corresponding rates. Remote access may be facilitated, for example, by a TCP/IP connection.

Figure 3:
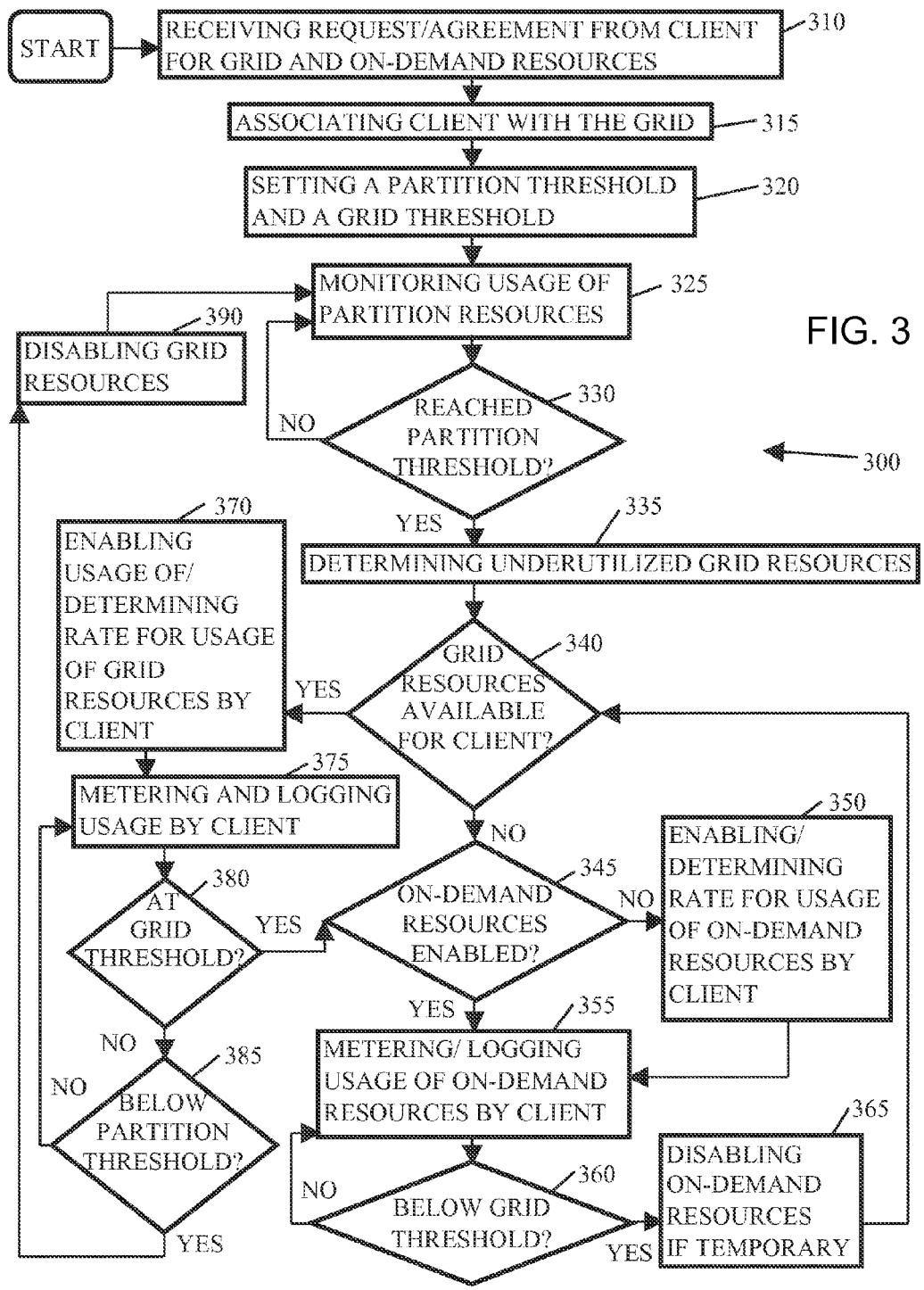
FIG. 3 depicts an embodiment of a method for expanding the resources available to a logical partition.

Referring now to FIG. 3, there is shown an example of a flow chart 300 for a method for expanding the resources available to a logical partition. Flow chart 300 begins with receiving a request or executing an agreement with a client to supplement partition resources of the client's logical partition with grid resources and on-demand resources (step 310). For example, the agreement may include provisions for turning on or making allocations from grid resources and on-demand resources when the client's use of partition resources of the logical partition reach utilization thresholds such as a partition utilization threshold and a grid utilization threshold. The agreement may also outline rates, or formulas therefore, associated with allocations from grid resources and on-demand resources or the provision of grid resources to the grid.

The client's logical partition is associated with the grid (step 315). Associating the client's logical partition with the grid (step 315) may involve an agreement between the service provider and the client to register the client's logical partition with the grid. For example, the client, in return for the opportunity to receive resource allocations from grid resources, may register a portion of partition resources associated with the client's logical partition to be used by the grid resource allocator.

The utilization thresholds agreed upon by the service provider and the client may then be stored in the logically partitioned system and associated with client's logical partition via a resource allocator (step 320). In some embodiments, a request may be made by the client to enable allocations of grid and on-demand resources by setting an indication that instructs a resource allocator to use these utilization thresholds (step 320).

After the utilization thresholds are enabled, usage of partition resources by the client's logical partition may be monitored (step 325) to determine when to allocate additional or supplemental resources to the logical partition. Usage of the partition resources may be checked continuously or periodically (step 330) until the usage of the partition resources reach or exceed the partition threshold.

Once the partition threshold has been reached or exceeded, grid resources are checked to determine whether they are underutilized, or available for allocation to the logical partition (step 335). Then, the extent of the client's current allocations from grid resources may be checked to determine whether the grid resources are available to the client (step 340). For instance, in some embodiments, the client's agreement with the service provider may provide that the logical partition may receive up to a certain allocation of grid resources such as an allocation proportional to the portion of the partition resources registered with the grid, or a straight percentage of grid resources, the remainder of grid resources being reserved for another customer(s). Once the logical partition exceeds the allotted share of grid resources, the logical partition may still receive allocations of grid resources, but, when another customer is allocated resources, and that customer has not surpassed an allotted share of grid resources, the client may begin to be charged for usage of on-demand resources and the customer may be charged a rate for grid resources, to the extent that on-demand resources were necessary to satisfy the allocation to the customer.

When grid resources are available to allocate to the client's logical partition, an allocation of grid resources may be enabled for use by the client's logical partition (step 370). In one embodiment, enabling grid resources for use by the client's logical partition may involve determining a rate associated with use of the grid resources. The rate may be determined based upon the actual usage of the grid resources or the allocation made to the logical partition. For example, a rate may be charged to the client once the utilization of grid resources reaches 80% of the total grid resources or for allocations greater than one processor unit of processing capacity to the same logical partition. Such rates may advantageously offset costs involved with enabling on-demand resources, for instance.

After enabling an allocation of grid resources for use by the client's logical partition, usage of the grid resources by the logical partition may be metered and logged (step 375). The usage may also be associated with the client of the logical partition. In alternative embodiments, when clients are not charged for allocations from grid resources, steps 370 and 375 may not be implemented.

Allocations of grid resources may then be checked to determine whether the utilization threshold for the total resources associated with the grid has been reached or exceeded (step 380). For example, when the grid resources have been, e.g., 100% utilized, the service provider may want to enable on-demand resources to assure that resources are available to the client or other customers for additional allocations.

When sufficient grid resources are determined to remain available, the client's allocation of grid resources continues to be metered (step 385), or just provided when allocated at no cost to the client. On the other hand, if the usage of resources by the client's logical partition fall below the partition threshold (step 385), grid resources that were allocated to the client are de-allocated (when available to de-allocate) so the resources are available for subsequent allocations to the client or other customers (step 390). The client's usage of partition resources is then monitored to determine when to provide a subsequent allocation of resources. In further embodiments, a hysteresis is built into the partition threshold to prevent a cycle of repeated allocations and de-allocations of resources to the client's logical partition. For instance, when the partition threshold is set to 80% of the partition resources, de-allocation of grid resources may not occur until the usage of partition resources fall below 70%.

When grid resources are unavailable to the client (step 340) or usage of grid resources reaches a grid threshold (step 380), subsequent allocations may include on-demand resources. When on-demand resources have not been enabled (step 345), an enablement code is requested and the on-demand resources are enabled (step 350). Further, a rate for the client for the allocation of on-demand resources to the logical partition is determined so the rate can be associated with the allocation or actual usage of the on-demand resources (step 350).

After the on-demand resources are enabled, usage such as actual usage and/or allocations to the logical partition may be metered and logged (step 355). The rate entered in the log and associated with the usage may be determined and entered when allocations are made for the usage, periodically during the usage, or after enablement code for the on-demand resources has expired.

The grid threshold may be checked periodically or monitored continuously (step 360) to determine when the allocations of grid resources may be substituted for allocations of on-demand resources (via steps 340 and 370), removing or reducing the rate associated with the resource allocation in some cases. When the usage of grid resources falls below the grid threshold (step 360), the on-demand resources may be disabled and de-allocated (step 365). For example, when the enablement code is provided with a resource-time value, which enables the on-demand resources and accommodates various quantity and time combinations for the use of on-demand resources, disabling the on-demand resources may involve migrating use of current allocations of on-demand resources to grid resources, de-allocating current allocations of on-demand resources, and preventing subsequent allocations of on-demand resources until usage of the grid resources reach or exceed the grid threshold. Thus, on-demand resources from the same enablement code may be conserved for subsequent allocations.

Figure 4:
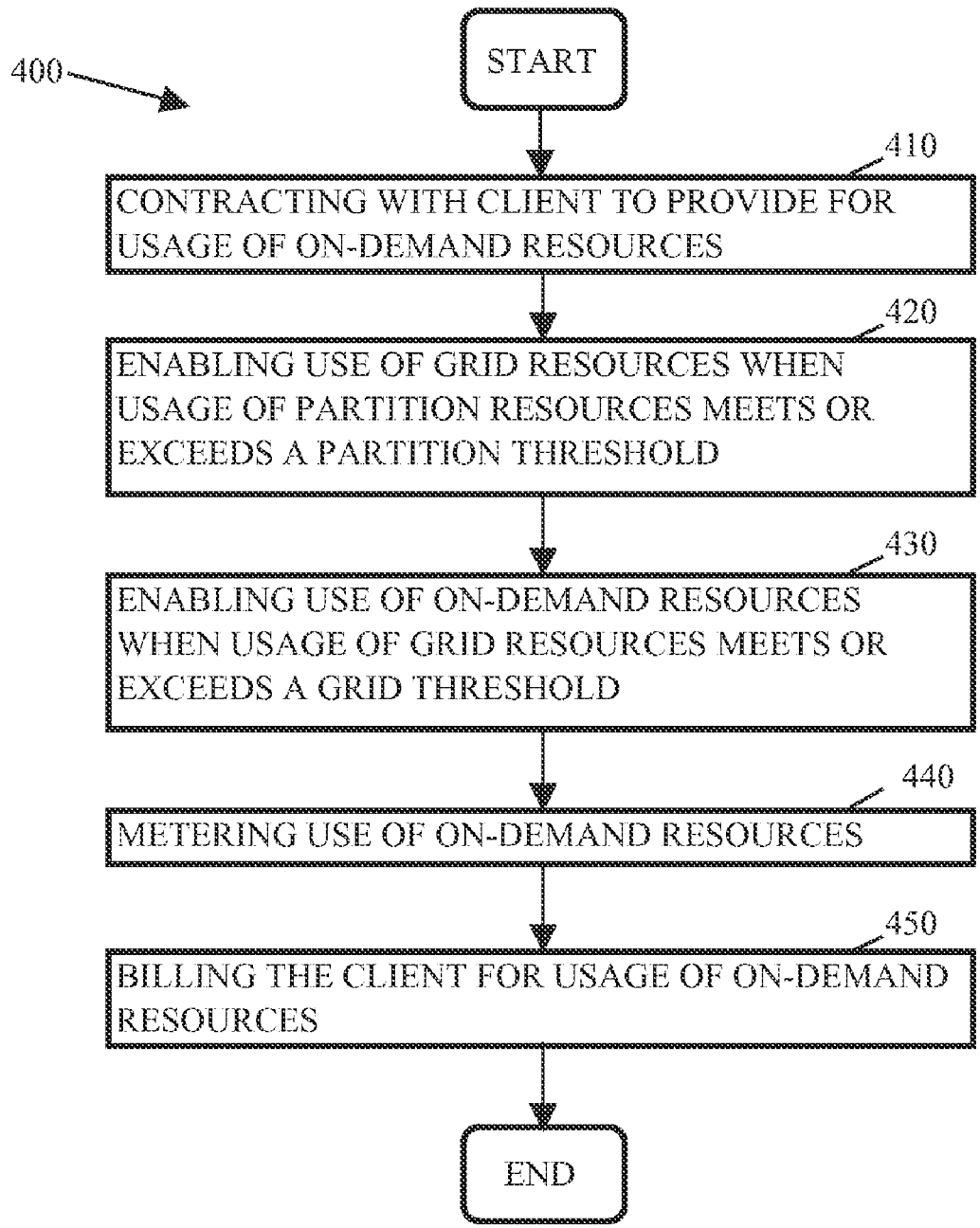
FIG. 4 depicts an embodiment of a method for billing a client based upon usage of additional resources available to a logical partition.

FIG. 4 depicts an example of a flow chart 400 for a method for billing a client based upon usage of additional resources available to a logical partition. Flow chart 400 begins with contracting with a client to provide for usage of on-demand resources by the client's logical partition (step 410). Contracting with the client may involve receiving a request or preferences (step 410). For instance, the client may be able to access the logical partition and check off preferences such as "associate this logical partition with a grid", "enable allocations of when the partition reaches or exceeds a utilization threshold", "enable on-demand resources to meet resource capacity demands", and the like.

When the partition threshold is exceeded, resources to be allocated from the grid are enabled (step 420). In other words, once the usage of partition resources reaches a utilization threshold, a request by the logical partition for a resource, such as processing capacity, will be allocated from grid resources rather than partition resources. If grid resources are not available or the insufficient grid resources are available, for instance, the grid threshold may be reached or surpassed and resources are enabled and allocated to the logical partition from on-demand resources (step 430). On the other hand, when sufficient grid resources are available for the allocation, the entire allocation may be made from grid resources and the grid threshold may or may not reach the grid threshold of utilization.

When the grid threshold is reached or surpassed, on-demand resources may be enabled (step 430). For example, the service provider may permanently enable on-demand resources and recoup the costs by charging a rate for using on-demand resources. Thus, allocations of on-demand resources or actual usages of on-demand resources may be associated with one or more rates based upon resource quantity and/or time via metering (step 440).

The client can then be billed for metered usage such as metered allocations or metered actual usage, based upon the rates and/or rate formulas agreed to by the client (step 450). The bill may be presented to the client electronically via a web server, an email, a facsimile, United States Postal Service, or the like.

Figure 5:
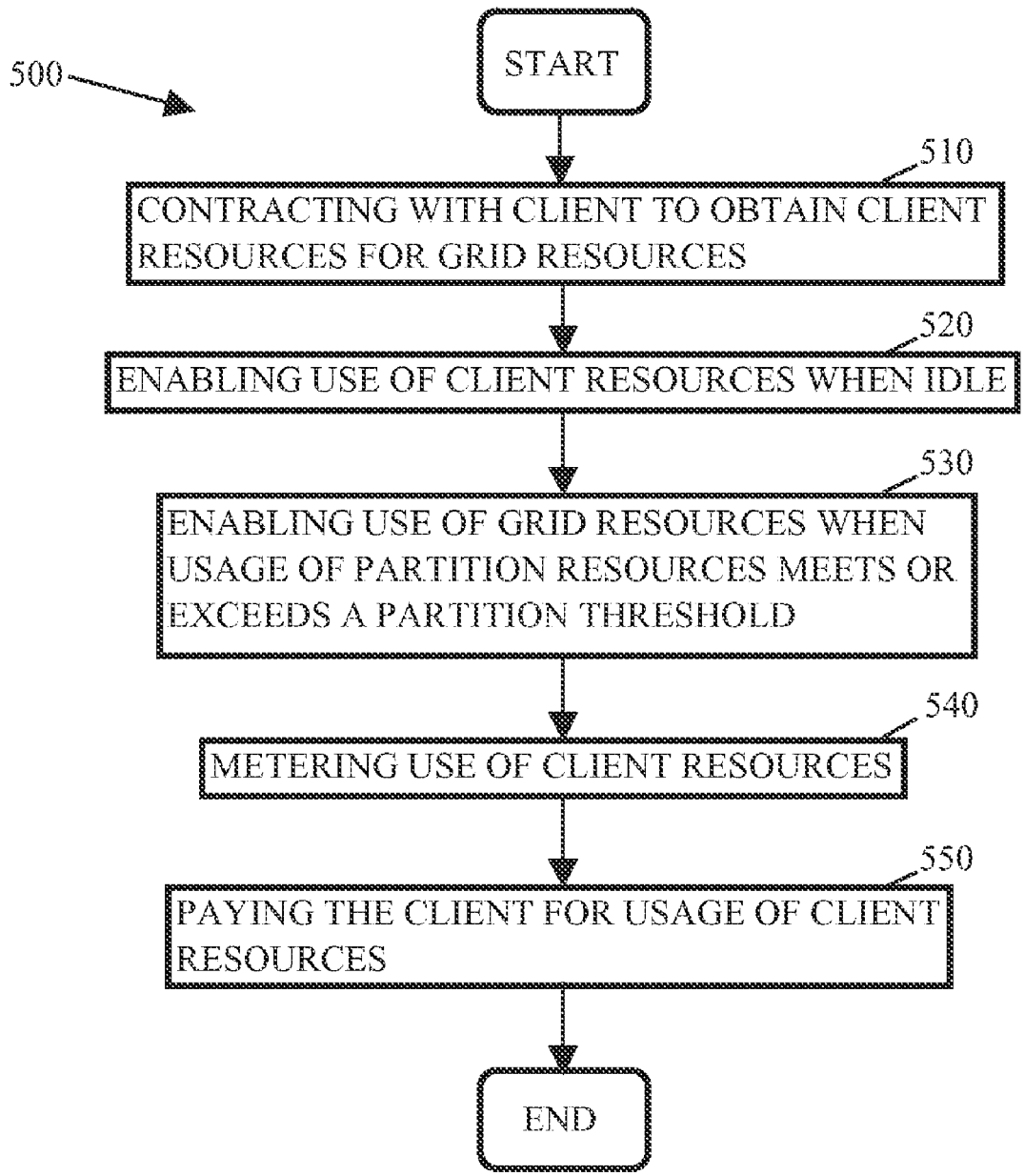
FIG. 5 depicts an embodiment of a method for paying a client based upon usage of the client's resources, which are made available to a logical partition.

FIG. 5 depicts an example of a flow chart 500 for a method for paying a client based upon usage of the client's resources, which are made available to a logical partition. Flow chart 500 begins with contracting with a client to obtain client resources for grid resources (step 510). For instance, the client may have resources such as processing power that is idle for extended periods (e.g. over night) and may want to either reduce rates for other services, receive discounts, register with the grid resources, or receive some other form of payment such as cash. The client contracts with the service provider to make the idle resources available at certain times, upon request when and/or to the extent that client resources are idle, when the client indicates the resources are available, or the like. Then, the client's resources are enabled in step 520 to make them available for allocation to a logical partition, e.g., a logical partition for another client in a different time zone that can make use of the idle resources during the night.

When the partition threshold is exceeded, resources to be allocated from the grid are enabled (step 530). Priorities may be associated with grid resources from different client's based upon the client's agreement with the service provider. For example, when the cost of the client's resources is higher than the cost for other grid resources, the client's resources may be selected last. In other circumstances, when multiple clients provide grid resources, an arbitration like scheme may be implemented to make substantially equivalent use of the resources from each client.

Allocations of client resources or actual usages of client resources may be associated with one or more rates based upon resource quantity and/or time via metering (step 540). Then, the client can be paid based upon metered usage and based upon the rates and/or rate formulas via payment methods agreed to by the client (step 550). For instance, the client may receive a rate reduction for grid resources, on-demand resources, or other resources and/or may receive direct payments. In some embodiments, the client's invoice/payment may request funds or include a check depending upon usage of the client's resources.

While the foregoing is directed to embodiments of the present invention, other and further embodiments of the invention may be devised without departing from the basic scope thereof, and the scope thereof is determined by the claims that follow.

What is claimed is:

1. A method for expanding resources available to a first logical partition on a single computer associated with a client, the method comprising:
   associating one or more partition resources of the first logical partition with a grid, wherein the grid comprises grid resources that are available for use by a plurality of logical partitions associated with the grid;
   providing grid resources from the grid to the first logical partition based upon usage of the partition resources of the first logical partition, wherein providing grid resources occurs upon determining that use of partition resources of the first partition has reached a partition resource usage condition; and
   providing on-demand resources to the first logical partition-based upon the usage of the partition resources of the first logical partition and a usage of the grid resources, wherein providing on-demand resources occurs upon determining that use of the grid resources has reached a grid resource usage condition, and wherein access to the on-demand resources is controlled by a manufacturer of the single computer, wherein providing on-demand resources comprises:
      requesting an enablement code to enable the on-demand resources; and
      allocating an unallocated portion of the enabled on-demand resources to the first logical partition.

2. The method of claim 1, further comprising metering a usage of the grid resources and the on-demand resources by the client to determine a cost to assess the client.

3. The method of claim 1, wherein associating the one or more partition resources of the first logical partition comprises enabling allocations from the grid resources to the logical partition.

4. The method of claim 1, wherein associating the one or more partition resources of the first logical partition comprises registering with the grid at least a portion of partition resources associated with the first logical partition, to allow the portion to be allocated to the plurality of logical partitions associated with the grid.

5. The method of claim 1, wherein providing grid resources comprises:
   determining an unallocated portion of the grid resources; and
   allocating the unallocated portion of the grid resources to the first logical partition.

6. The method of claim 1, wherein providing grid resources comprises:
   determining that use of partition resources of the first partition has at least reached a partition utilization threshold; and
   allocating an unallocated portion of the grid resources to the first logical partition.

7. The method of claim 1, wherein the partition resource usage condition comprises
   a partition utilization threshold.

8. The method of claim 1, wherein the grid resource usage condition comprises
   a grid utilization threshold.

9. A method for expanding resources available to logical partitions on a single computer associated with a client, the method comprising:
   registering resources with a grid as grid resources, wherein the grid resources are available for use by a plurality of logical partitions;
   allocating grid resources to a first logical partition after utilization of partition resources of the first logical partition reaches a first utilization threshold;
   allocating on-demand resources to the first logical partition after the first logical partition reaches a second utilization threshold for the grid resources, wherein access to the on demand resources is controlled by a manufacturer of the single computer, wherein allocating on-demand resources comprises:
      requesting an enablement code to enable the on-demand resources; and
      allocating an unallocated portion of the enabled on-demand resources to the first logical partition; and
   billing the client for usage of the on-demand resources.

10. The method of claim 9, further comprising billing the client for usage of the grid resources to offset a cost associated with enabling the on-demand resources.

11. The method of claim 9, wherein billing the client for usage of the on-demand resources comprises billing the client for the on-demand resources allocated to the first logical partition based upon actual usage of the on-demand resources.

12. The method of claim 9, wherein billing the client for usage of the on-demand resources comprises billing the client for the on-demand resources allocated to the first logical partition based upon a quantity of the on-demand resources allocated and the amount of time for which the quantity of the on-demand resources are allocated.

13. A method for managing and controlling allocation of resources to a logical partition on a single computer, comprising:
   providing grid resources to the logical partition based upon usage of partition resources of the logical partition, wherein the grid resources comprise one or more resources from each of a plurality of logical partitions of the system, the grid resources being available for use by each partition of the single computer, and wherein providing grid resources occurs upon determining that use of partition resources of the logical partition has reached a partition resource usage condition; and
   providing on-demand resources to the logical partition based upon the usage of the partition resources of the logical partition and a usage of the grid resources, wherein access to the on demand resources is controlled by a manufacturer of the single computer, and wherein providing on-demand resources occurs upon determining that use of the grid resources has reached a grid resource usage condition, and wherein providing on-demand resources comprises:
      requesting an enablement code to enable the on-demand resources; and
      allocating an unallocated portion of the enabled on-demand resources to the logical partition.

14. The method of claim 13, wherein the partition resource usage condition comprises
   a partition utilization threshold.

15. The method of claim 13, wherein the grid resource usage condition comprises
   a grid utilization threshold.

16. The method of claim 15, wherein the grid utilization threshold comprises an amount of grid resources used during a predetermined amount of time.

17. The method of claim 13, further comprising:
applying a first fee for use of the grid resources; and
applying a second fee for use of the on-demand resources.

18. The method of claim 17, wherein at least one of the first fee and the second fee vary based on a factor chosen from the group consisting of a time of day and a time of year.

19. A method for deploying a computer application on a host service provider system, comprising:
installing a computer application on a logical partition of a single computer, the single computer having on-demand resources associated therewith, wherein access to the on demand resources is controlled by a manufacturer of the single computer;
associating the logical partition with a grid, the grid having grid resources that are available for use by any logical partition of the single computer;
configuring the single computer to provide the grid resources to the logical partition based upon usage of the partition resources of the logical partition, wherein the grid resources are provided upon determining that use of partition resources of the logical partition has reached a partition resource usage condition; and
configuring the single computer to provide the on-demand resources to the logical partition based upon a usage of the grid resources, wherein the on-demand resources are provided upon determining that use of the grid resources has reached a grid resource usage condition, wherein providing on-demand resources comprises:
requesting an enablement code to enable the on-demand resources; and
allocating an unallocated portion of the enabled on-demand resources to the first logical partition.

20. The method of claim 19, further comprising:
applying a first fee for use of the grid resources; and
applying a second fee for use of the on-demand resources.

21. The method of claim 1, further comprising providing on demand resources to one of the plurality of logical partitions.

* * * * *